US009727712B2

(12) United States Patent
Dahan et al.

(10) Patent No.: US 9,727,712 B2
(45) Date of Patent: Aug. 8, 2017

(54) SYSTEM THAT ENFORCES ACCOUNTABILITY BY REQUIRING JUSTIFICATIONS FOR SENSITIVE INFORMATION TECHNOLOGY OPERATIONS

(71) Applicants: Miamon Dahan, Tel-Aviv (IL); Ilan Kleinberger, Jerusalem (IL); Amir Jerbi, Givatayim (IL); Nir Barak, Karmei Yosef (IL)

(72) Inventors: Miamon Dahan, Tel-Aviv (IL); Ilan Kleinberger, Jerusalem (IL); Amir Jerbi, Givatayim (IL); Nir Barak, Karmei Yosef (IL)

(73) Assignee: CA, Inc., New York, NY (US)

( * ) Notice: Subject to any disclaimer, the term of this patent is extended or adjusted under 35 U.S.C. 154(b) by 223 days.

(21) Appl. No.: 14/278,935

(22) Filed: May 15, 2014

(65) Prior Publication Data
US 2015/0332028 A1   Nov. 19, 2015

(51) Int. Cl.
G06F 3/048 (2013.01)
G06F 21/31 (2013.01)
G06F 21/60 (2013.01)

(52) U.S. Cl.
CPC .............. G06F 21/31 (2013.01); G06F 21/60 (2013.01); G06F 21/604 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,737,530 A * | 4/1998 | Kukkal | ................. | H04M 3/567 709/204 |
| 7,533,277 B2 * | 5/2009 | Bernstein | .............. | G06F 9/4418 713/300 |
| 7,788,474 B2 * | 8/2010 | Switzer | ................... | G06F 9/485 713/1 |
| 7,865,384 B2 * | 1/2011 | Anderson | ............ | G06Q 10/063 705/7.11 |
| 7,958,216 B2 * | 6/2011 | Stienhans | ............... | G06F 9/442 709/205 |
| 2003/0084276 A1 * | 5/2003 | Levidow | ............. | G06F 11/0709 713/1 |
| 2005/0171797 A1 * | 8/2005 | Abigail | ............ | G06Q 10/06375 705/7.37 |
| 2006/0253553 A1 * | 11/2006 | Burckart | ............. | H04L 41/0813 709/220 |
| 2007/0112866 A1 * | 5/2007 | Olson-Williams | | G06F 17/30312 |
| 2008/0065680 A1 * | 3/2008 | Moon | ............... | G06F 17/30292 |
| 2011/0030045 A1 * | 2/2011 | Beauregard | ............. | G06F 9/468 726/9 |

* cited by examiner

*Primary Examiner* — Hien Duong
(74) *Attorney, Agent, or Firm* — Baker Botts L.L.P.

(57) ABSTRACT

A method for requiring justifications for predetermined user operations may include maintaining a plurality of policies in a policy store, and detecting a user operation, via a policy module, that triggers a policy of the plurality of policies. The method may also include pausing user operation, notifying the user of the impact of the user operation that triggered the policy, and requesting justification from the user for the user operation. The method may further include storing user-provided justification in a predetermined location, and then resuming the user operation.

18 Claims, 5 Drawing Sheets

SYSTEM THAT ENFORCES ACCOUNTABILITY BY REQUIRING JUSTIFICATIONS FOR SENSITIVE INFORMATION TECHNOLOGY OPERATIONS

BACKGROUND

The disclosure relates generally to enforcing accountability for certain user operations within an application or service, and more specifically to a system and method for requiring user-input justifications for predetermined user operations deemed to affect sensitive information technology ("IT") operations.

SUMMARY

According to one embodiment of the disclosure, a method for requiring justifications for predetermined user operations may include maintaining a plurality of policies in a policy store, and detecting a user operation, via a policy module, that triggers a policy of the plurality of policies. The method may also include pausing user operation, notifying the user of the impact of the user operation that triggered the policy, and requesting justification from the user for the user operation. The method may further include storing user-provided justification in a predetermined location, and then resuming the user operation.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Figure 1:
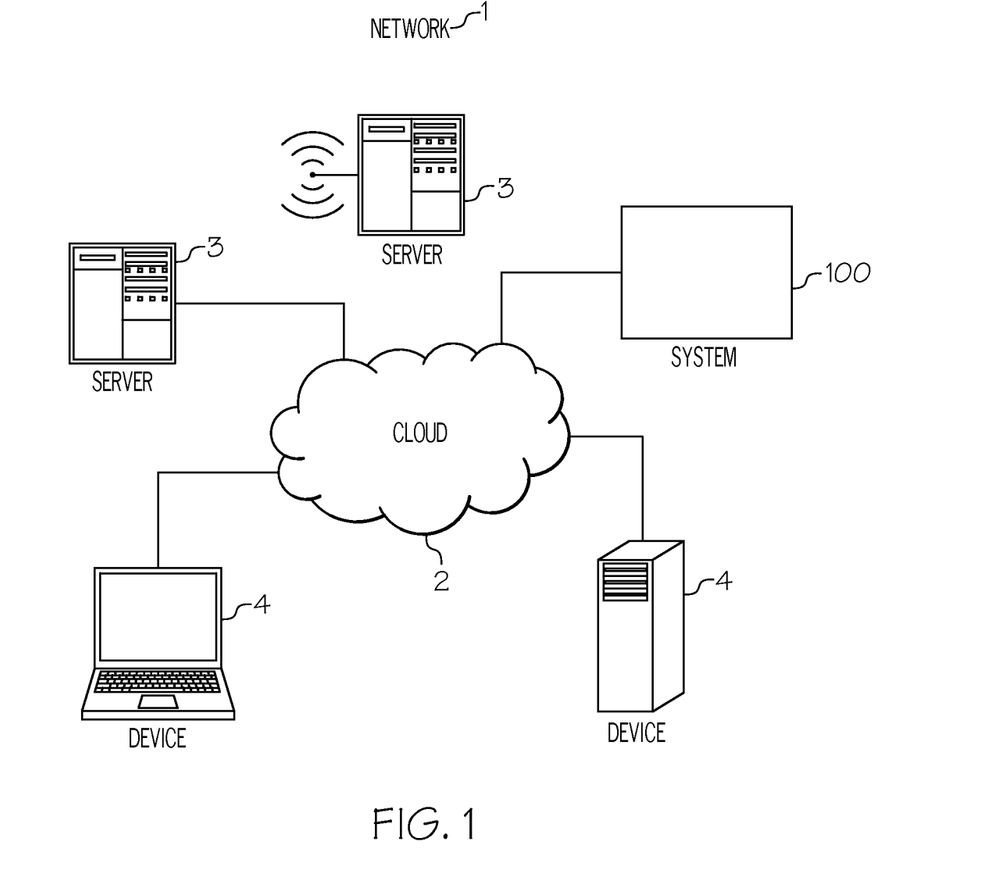
FIG. 1 illustrates a block diagram of a network for a user to access a user-operation accountability module, in accordance with a particular embodiment of the present disclosure.

Referring now to FIG. 1, a network 1 allows a user to access and use a user-operation accountability module (e.g., for cloud-based services). The user-operation accountability module may be internally provided or sourced through third parties. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Example items may include network 1, cloud 2, servers 3, and devices 4.

Moreover, network 1 may comprise one or more systems 100 that may provide a user-operation accountability module. System 100 may be, for example, one or more of a general purpose computing device, a specialized computing device, a wired device, a wireless device, a mainframe device, an infrastructure device, a monitoring device, and any other device configured to provide a user-operation accountability module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information (including, e.g., user operation information), document content information, information on the consequences of user operations, and other information provided by service providers and users. By collecting the available information from network 1, cloud 2, servers 3, devices 4, and other devices connected to cloud 2, system 100 may perform one or more tasks associated with using the user-operation accountability module, which is discussed in more detail below. In some configurations, one or more of servers 3 and devices 4 may comprise system 100. In other configurations, system 100 may be separate from servers 3 and devices 4.

In today information systems, a user's action and/or operation may have serious and detrimental effects to critical or important components of the system. Oftentimes, the user may not comprehend the full extent and consequences of the action and/or operation at the time of engaging in the action and/or operation. Thus, a current problem is that some IT operations, even when implemented by users with the correct privileges, may have a significant effect on critical or important IT systems or services. For example, a privileged user can intentional, or mistakenly, stop a process on a server without knowing that stopping this process can impact a critical business service (e.g., running a remove command on a wrong directory and/or folder can cause significant data loss).

The teachings of the present disclosure may provide a user-operation accountability module that will require and record a user's justification when performing sensitive IT operations that have a potentially destructive or detrimental outcome, based on predefined policies. In particular, the teachings of this disclosure enable a system that warns the user on the consequences of actions related to an action and/or operation he is about to take and requires the user to supply justification and acknowledge the operation before proceeding with the operation which has been specified as sensitive by an administrator. In addition, the teachings of this disclosure enable a system that lets the user know about company policies for an action being taken, for example. For example, an impact can be non-mechanical (e.g., if a user deletes a folder, data may be lost), or a business or commitment issue (e.g., the company has a policy to notify the customer before restarting the server). This ensures that the user has full knowledge of the policies and potential impact of his actions on the system, as well as forcing accountability of the user for his actions and allowing tracking of sensitive operations. These policies may contain information on, for example, which operations (e.g., user operations) would require user justification (e.g., when to fire the policy), and under what conditions an operation would require user justification (e.g., machines with predetermined qualities or conditions, a predetermined time interval, a user with predetermined qualities, or any other administrative user-defined conditions). In addition, the operation may be blocked until the user supplies the justification and acknowledges the impact of the operation. For example, when a user's action triggers a policy, the system may stop the action, inform the user of the policy and the potential results of the action, and require a justification from the user for the action before allowing the user to continue. These actions may include any modification of a system, including deleting components (e.g., files, folders, etc.), moving components, updating components, and any other potential modification of the system. Moreover, such a system may have the ability to easily integrate with a variety of systems and applications.

Figure 2:
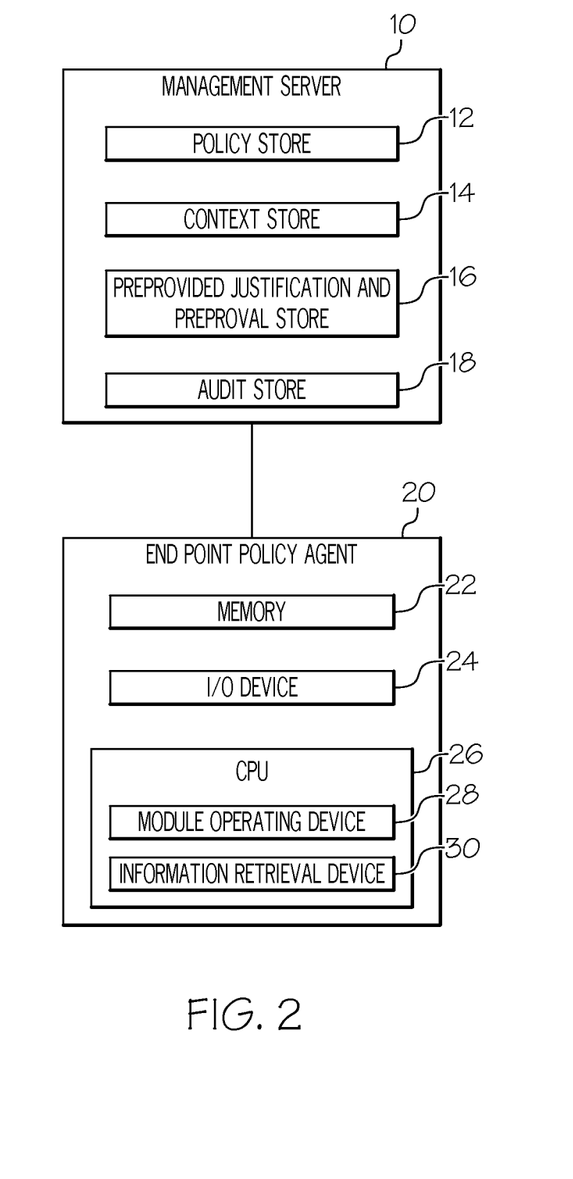
FIG. 2 illustrates a block diagram of a system for presenting the user-operation accountability module, in accordance with a particular embodiment of the present disclosure.

Referring now to FIG. 2, management server 10 and endpoint policy agent 20, which collaborate to form the user-operation accountability module, are now described. Management server 10 may reside on any of servers 3, devices 4, and systems 100. Preferably, management server 10 resides on servers 3. Similarly, endpoint policy agent 20 may reside on any of servers 3, devices 4, and systems 100. Preferably, endpoint policy agent 20 resides on devices 4 and/or systems 100.

Management server 10 may comprise a policy store 12, a context store 14, a preprovided justification and preapproval store 16, and an audit store 18. Alternatively, policy store 12, context store 14, and audit store 18 may reside on different servers 3 from management server 10. Policy store 12 may, for example, store accountability and/or policies, which may be defined by a system administrator. These policies may contain information on, for example, which operations (e.g., user operations) would require user justification (e.g., when to fire the policy), and under what conditions an operation would require user justification (e.g., machines with predetermined qualities or conditions, a predetermined time interval, a user with predetermined qualities, or any other administrative user-defined conditions). Examples of user operations that may require justifications include, but are not limited to, actions that involve changes to the system (e.g., deleting a file, moving a file, editing a file, etc.); and actions that do not involve changes to the system (e.g., starting, stopping and restarting servers or applications, logging onto a restricted system, accessing a restricted file). Context store 14 may, for example, store links between objects and/or actions and information on the consequences of modifying an object and/or taking an action. These consequences may include the impact of the operations on the business and/or system and/or program. Audit store 18 may, for example, store accountability information (i.e., user-provided justifications for certain actions) submitted by the user, in addition to the associated conditions of the submission. For example, if a user refuses to submit a justification for an action, audit store 18 will store this information as a condition of the (lack-of) justification information. As such, a purpose of audit store 18 is to provide a repository for future inquiries into and reporting of the justifications for actions that occurred.

Preprovided justification and preapproval store 16 may have two purposes. One purpose is to provide preprovided justifications for users working on multiple programs and/or machines (e.g., doing maintenance, making changes) who do not want to deal with the inefficiencies of providing a justification for their actions after every modification they make to the program and/or machine. In this situation, preprovided justification and preapproval store 16 stores "group" justifications based on context (e.g., time, program, etc.), and thus does not prompt for an individual justification for each action. Another purpose is in the situation of especially critical systems in which additional preapproval (i.e., preauthorization) of certain user actions by a predefined person (e.g., a manager, an owner, etc.) is required, as defined by an accountability and/or policy. In this situation, the preauthorization needs to be logged into (i.e., save in) the system by the predetermined person before any operations can take place.

Endpoint policy agent 20 may comprise a memory 22, an input and output ("I/O") device 24, and a central processing unit ("CPU") 26. CPU 26 may include more than one processing units. Memory 22 may store computer-readable instructions that may instruct system 100 to perform certain processes. As discussed above, memory 22 may comprise, for example, RAM, ROM, EPROM, Flash memory, or any suitable combination thereof. In particular, when executed by CPU 26, the computer-readable instructions stored in memory 22 may instruct CPU 26 to operate as one or more devices. CPU 26 may operate as a module operating device 28 and an information retrieval device 30.

I/O device 24 may receive data from networks 1, data from other devices connected to system 100, and/or input from a user and provide such information to CPU 26. I/O device 106 may transmit data to networks 1, may transmit data to other devices connected to system 100, and may transmit information to a user (e.g., display the information via a display device). Further, I/O device 24 may implement one or more of wireless and wired communication between system 100 and other devices.

Figure 3:
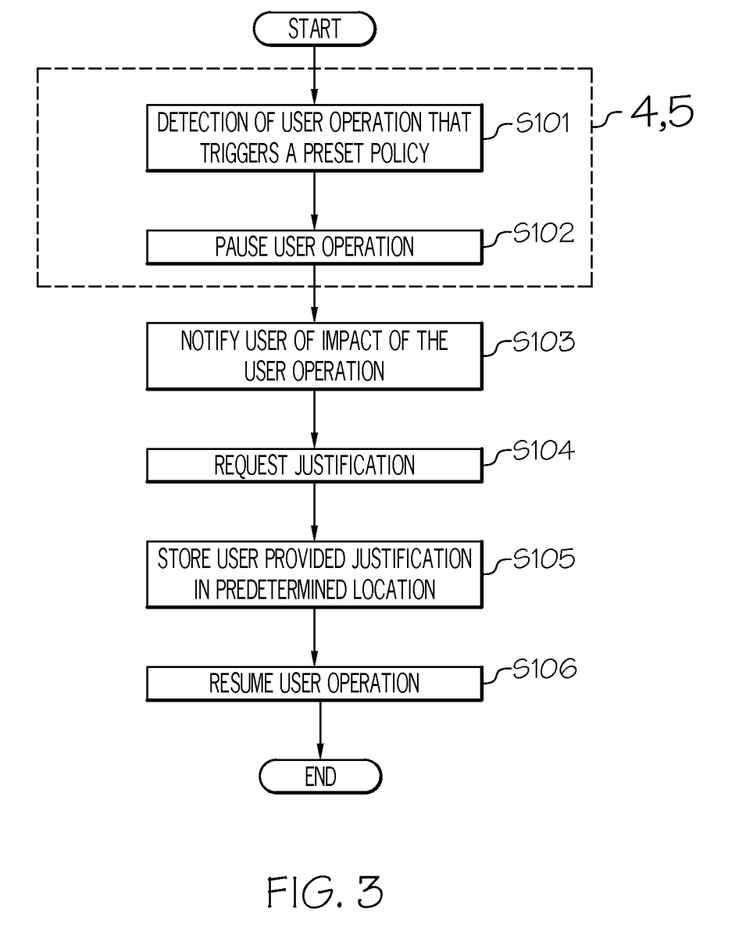
FIG. 3 illustrates a flow chart of a method for requiring justifications for sensitive IT operations, in accordance with a particular embodiment of the present disclosure.
Figure 4:
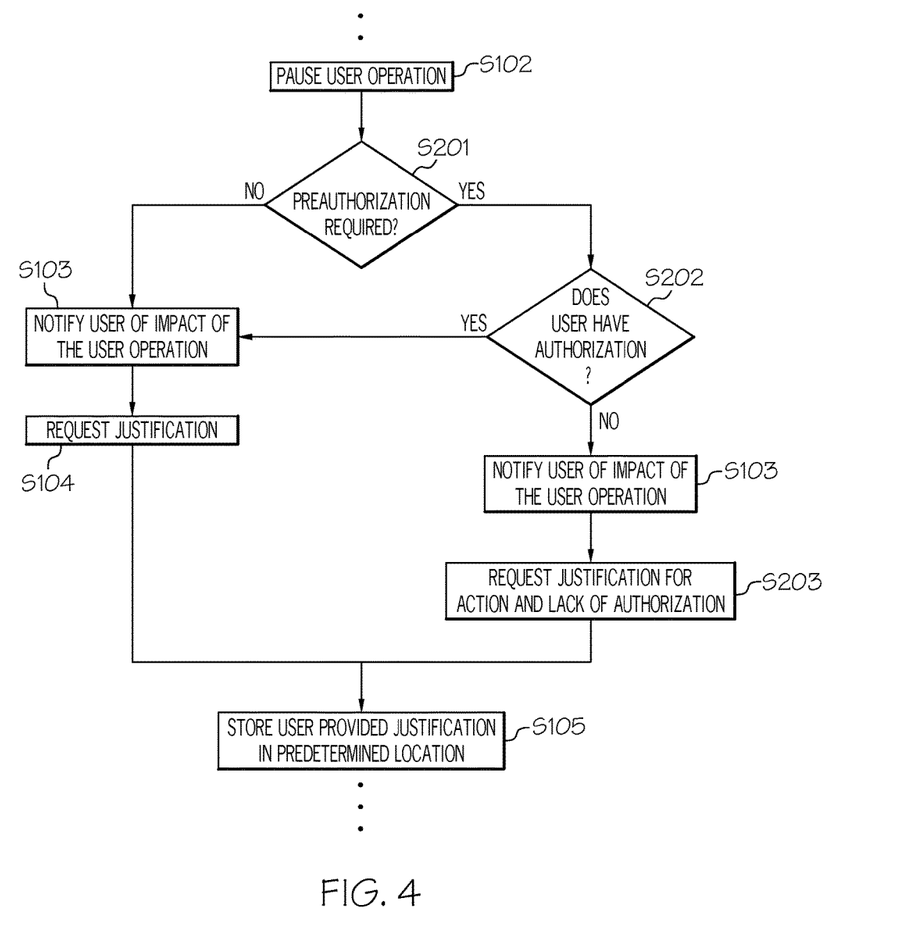
FIG. 4 illustrates a flow chart of a method for determining whether preapproval is required for sensitive IT operations, in accordance with a particular embodiment of the present invention.
Figure 5:
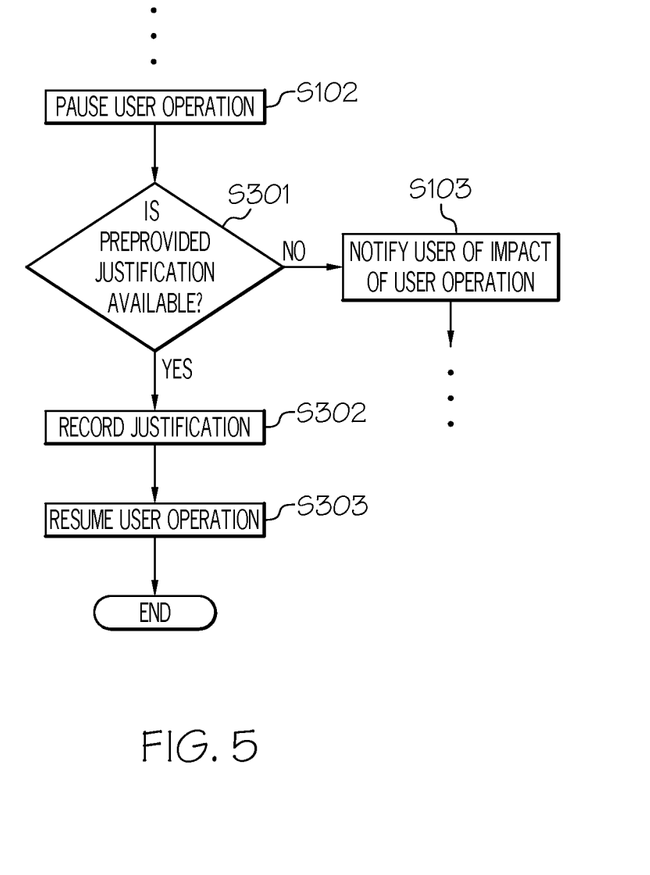
FIG. 5 illustrates a flow chart of a method for determining preapproved justification for a user operation is available, in accordance with a particular embodiment of the present invention.

Referring now to FIGS. 3-5, processes performed by management server 10 and endpoint policy agent 20 are now described.

FIG. 3 illustrates a method for requesting and storing user justifications for sensitive operations. In S101, endpoint policy agent 20, operating as module operating device 28, may detect a user operation that triggers a preset policy. For example, endpoint policy agent 20, operating as information retrieval device 30, may access the list of policies stored in policy store 12, and may determine that the user operation triggers a preset policy stored in policy store 12. Then, in S102, module operating device 28 may pause the user operation.

In S103, endpoint policy agent 20, operating as I/O device 24, may present a message to be shown to the user. The message may contain the organizational policy relevant to the action that the user is trying to perform and the consequences of the action (i.e., if the user goes through with the action). For example, endpoint policy agent 20, operation as information retrieval device 30, may access information from context store 14 on the consequences of the specific action the user is trying to perform. In addition, the message may contain a request for managerial/owner preauthorization (discussed below).

In S104, after providing the user with the relevant organizational policy and the consequences of the action, endpoint policy agent 20, operating as I/O device 24, may request acknowledgement of the impact of the action and justification for the action (i.e., a reason for the forward with the action in view of the potential impact of the action) from the user. Then, in S105, endpoint policy agent 20 may store the user-provided acknowledgement and justification in a predetermined location. For example, endpoint policy agent 20 may store this information directly in audit store 18, or initially store this information in memory 22 and then move the information to audit store 18 at a later time.

Thereafter, in S106, endpoint policy agent 20 may resume the user operation and allow the user to proceed with an action, which may be either the original action the user intended to proceed with, or an alternative action. For example, before any potentially destructive or detrimental action can take place, because the user is now aware of the effects of his previously-intended action, the user may determine that the original action was a mistake (e.g., removing/editing the wrong file), and thus proceed with a different course of action. Then, once the user operation is resumed, the process may terminate. As an example, in a system that is implementing this process, when a user tries to resume a service which is marked in an accountability policy, the user may be required to acknowledge that he is aware of what his action can cause and supply justification for his actions before the operation resumes. Once the justification is supplied, the activity and justification may be sent to the server to be stored in an audit store for further queries and reporting.

FIG. 4 illustrates a method for providing an additional requirement of pre-authorization of a user operation by a predefined preauthorization provider (e.g., manager, owner, etc.) for especially critical systems. In particular, this pre-authorization can be provided by the authorization provider beforehand to management server 10 and stored in preprovided justification and preapproval store 16. For example, this pre-authorization may be defined by authorization for a specific user, a specific task/machine/system, a specific policy, or any other suitable authorization criteria. Then, when the user's operation triggers a preset policy (S101 of FIG. 1), and after user operation is paused (S102 of FIG. 1), in S201, endpoint policy agent 20, operating as a module operating device 28, determines whether preauthorization for the user's operation is required.

If module operating device 28 determines that preauthorization is required (S201: YES), then module operating device 28 determines whether any preauthorization is available for the user's operation (S202). For example, endpoint policy agent 20, operation as information retrieval device 30, may access information from preprovided justification and preapproval store 16 on available, previously-inputted, preauthorization for the user operation. If module operating device 28 determines that preauthorization is not required (S201: NO), or if module operating device 28 determines that preauthorization is available for the user's operation (S202: YES), then module operating device 28 will proceed with the steps shown in FIG. 1 (i.e., continue with the step of S103 of notifying the user of the impact of the user operation).

If, however, module operating device 28 determines that preapproval is not available for the user's operation (S202: NO), then in S103, module operating device 28 will notify the user of the impact of the user operation. Next, in S203, endpoint policy agent 20 operating as I/O device 24, may request acknowledgement of the impact of the action, justification for the action (i.e., a reason for the forward with the action in view of the potential impact of the action), and a justification for not obtaining preauthorization for the action from the user. After receiving an input from the user, then module operating device 28 will proceed with the steps shown in FIG. 1 (i.e., continue with the step of S105 of storing the user-provided justifications).

FIG. 5 illustrates a method for supplying justification ahead of time. For example, this may be useful when a user wants to do maintenance work on multiple machines and does not want to be asked for justification every time a modification is made. In particular, these justifications can be provided by the user beforehand to management server 10 and stored in preprovided justification and preapproval store 16. For example, these justifications may be defined by a set time period, a predetermined action, predetermined specific machines and/or systems, or other suitable justifications. Then, when the user's operation triggers a preset policy (S101 of FIG. 1), and after user operation is stopped (S102 of FIG. 1), in S301, endpoint policy agent 20, operating as module operating device 28, determines whether preapproval justification is available. For example, endpoint policy agent 20, operation as information retrieval device 30, may access information from preprovided justification and preapproval store 16 on available, previously-inputted, justification for the user operation.

If module operating device 28 determines that a preprovided justification is available (S301: YES), in S302, endpoint policy agent 20 may store the preprovided justification in the predetermined location (e.g., audit store 18 or memory 22). Then, in S303, endpoint policy agent 20 may restart the user operation and allow the user to proceed with the user operation (i.e., the operation what has preprovided justification), and the process may then terminate. In consequence, module operating device 28 does not prompt for justification when it identifies that such justification was supplied ahead of time, and instead allows the user to proceed with the action.

If, however, module operating device 28 determines that a preprovided justification is not provided (S301: NO), then module operating device 28 will proceed with the steps shown in FIG. 1 (i.e., continue with the step of S103 of notifying the user of the impact of the user operation).

The flowchart and block diagrams in FIGS. 1-5 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for requiring justifications for predetermined user operations, comprising:
    maintaining a plurality of policies in a policy store;
    detecting a user-provided preapproved justification submitted by a user prior to a user operation;
    detecting the user operation, via a policy module, that triggers a policy of the plurality of policies;
    pausing the user operation;
    determining, based on the triggered policy, that the user operation requires preapproved justification;
    determining whether the existence of the user-provided preapproved justification satisfies the triggered policy;
    notifying the user of the impact of the user operation that triggered the policy;
    requesting acknowledgement from the user of the impact of the user operation that triggered the policy;
    storing the user-provided preapproved justification in a predetermined location; and
    in response to determining that the user-provided preapproved justification satisfies the triggered policy and receiving acknowledgement from the user of the impact of the user operation, resuming the user operation.

2. The method of claim 1, further comprising:
    determining, prior to notifying the user of the impact of the user operation, whether preauthorization of the user operation is required; and
    determining whether preauthorization of the user operation is available when it is determined that preauthorization of the user operation is required and
    wherein the method further comprises requesting justification for the lack of preauthorization when it is determined that preauthorization of the user operation is required and not provided.

3. The method of claim 1, further comprising:
    detecting a second user operation, via the policy module, that triggers a second policy of the plurality of policies;
    determining, based on the second policy, that the second user operation requires preapproved justification;
    determining that the user-provided preapproved justification is suitable for the second policy.

4. The method of claim 1, further comprising:
    upon determining that the user-provided preapproved justification does not satisfy the triggered policy, requesting justification from the user for the user operation.

5. The method of claim 1, wherein each of the plurality of policies contains a list of operations and conditions under which user justification is required.

6. The method of claim 1, wherein information on the impact of the user operation that triggered the policy is stored in a context storage device that stores a plurality of predetermined links between a predetermined user operation and the resulting consequence of the predetermined user operation.

7. A system for requiring justifications for predetermined user operations, comprising:
    a processor configured to perform;
    maintaining a plurality of policies in a policy store;
    detecting a user-provided preapproved justification submitted by a user prior to a user operation;
    detecting the user operation, via a policy module, that triggers a policy of the plurality of policies;
    pausing the user operation;
    determining, based on the triggered policy, that the user operation requires preapproved justification;
    determining whether the existence of the user-provided preapproved justification satisfies the triggered policy;
    notifying the user of the impact of the user operation that triggered the policy;
    requesting acknowledgement from the user of the impact of the user operation that triggered the policy;
    storing the user-provided preapproved justification in a predetermined location; and
    in response to determining that the user-provided preapproved justification satisfies the triggered policy and receiving acknowledgement from the user of the impact of the user operation, resuming the user operation.

8. The system of claim 7, wherein the processor is further configured to:
    determine, prior to notifying the user of the impact of the user operation, whether preauthorization of the user operation is required,
    determine whether preauthorization of the user operation is available when it is determined that preauthorization of the user operation is required, and
    wherein the requesting device requests justification for the lack of preauthorization when it is determined that preauthorization of the user operation is required and not available.

9. The system of claim 8, wherein the preapproval of the user operation is stored in a storage device.

10. The system of claim 7, further comprising:
    upon determining that the user-provided preapproved justification does not satisfy the triggered policy, the processor is configured to request justification from the user for the user operation.

11. The system of claim 7, wherein each of the plurality of policies contains a list of operations and conditions under which user justification is required.

12. The system of claim 7, wherein information on the impact of the user operation that triggered the policy is stored in a context storage device that stores a plurality of predetermined links between a predetermined user operation and the resulting consequence of the predetermined user operation.

13. A computer program product for requiring justifications for predetermined user operations, comprising:

a computer-readable storage medium having computer-readable program code embodied therewith, the computer-readable program code comprising:
  computer readable program code configured to maintain a plurality of policies in a policy store;
  computer readable program code configured to detect a user-provided preapproved justification submitted by a user prior to a user operation;
  computer readable program code configured to detect the user operation, via a policy module, that triggers a policy of the plurality of policies;
  computer readable program code configured to pause the user operation;
  computer readable program code configured to determine, based on the triggered policy, that the user operation requires preapproved justification;
  computer readable program code configured to determine whether the existence of the user-provided preapproved justification satisfies the triggered policy;
  computer readable program code configured to notify the user of the impact of the user operation that triggered the policy;
  computer readable program code configured to request acknowledgement from the user for the impact of the user operation that triggered the policy;
  computer readable program code configured to store the user-provided preapproved justification in a predetermined location; and
  computer readable program code configured to, in response to determining that the user-provided preapproved justification satisfies the triggered policy and receiving acknowledgement from the user of the impact of the user operation, resume the user operation.

14. The computer program product of claim 13, further comprising:
  computer readable program code configured to:
    determine, prior to notifying the user of the impact of the user operation, whether preauthorization of the user operation is required,
    determine whether preauthorization of the user operation is available when it is determined that preauthorization of the user operation is required, and
  wherein the computer readable program code requests justification for the lack of preauthorization when it is determined that preauthorization of the user operation is required and not available.

15. The computer program product of claim 14, wherein the preauthorization of the user operation is stored in a storage device.

16. The computer program product of claim 13, further comprising:
  computer readable program code configured to, upon determining that the user-provided preapproved justification does not satisfy the triggered policy, request justification from the user for the user operation.

17. The computer program product of claim 13, wherein each of the plurality of policies contains a list of operations and conditions under which user justification is required.

18. The computer program product of claim 13, wherein information on the impact of the user operation that triggered the policy is stored in a context storage device that stores a plurality of predetermined links between a predetermined user operation and the resulting consequence of the predetermined user operation.

* * * * *